Sept. 25, 1951
M. JAENCHEN
2,569,104
MANDREL BAR SUPPORT
Filed March 9, 1946
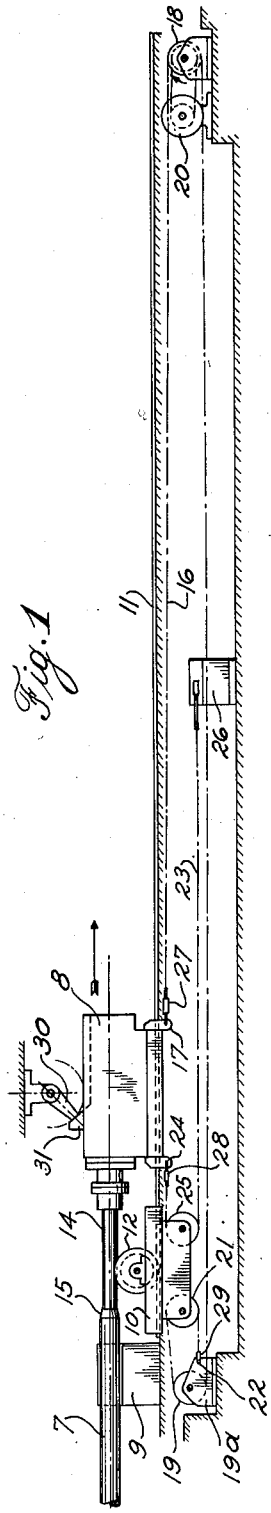
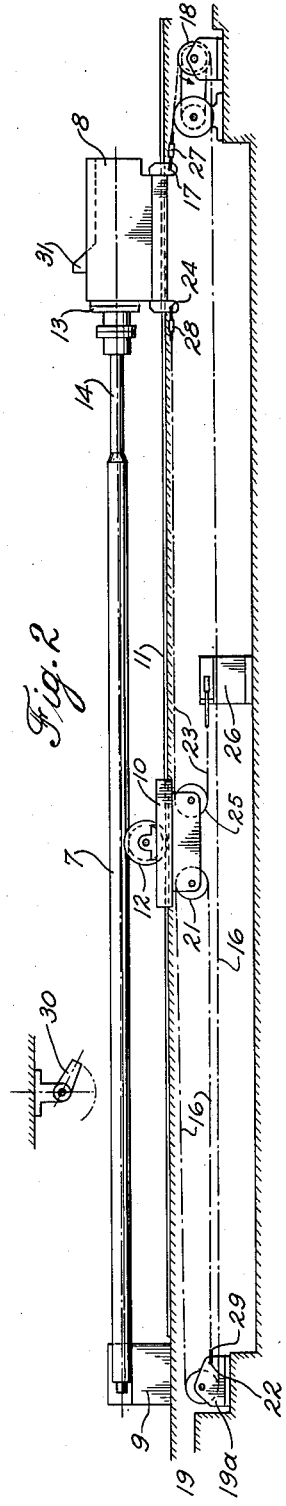
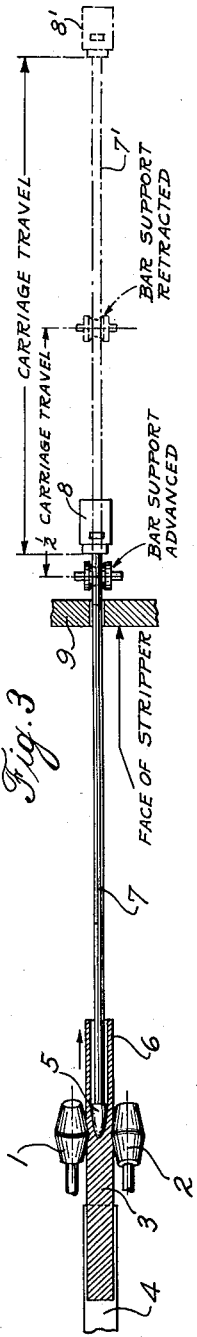
INVENTOR.
MAX JAENCHEN
BY
ATTORNEYS Patented Sept. 25, 1951

2,569,104

UNITED STATES PATENT OFFICE 2,569,104

MANDREL BAR SUPPORT

Max Jaenchen, Youngstown, Ohio, assignor to The Aetna-Standard Engineering Company, Youngstown, Ohio, a corporation of Ohio Application March 9, 1946, Serial No. 653,400

4 Claims. (Cl. 80—11)

This invention relates to the manufacture of tubing and more particularly to improvements in apparatus for supporting mandrel rods or bars employed in seamless tube mills or the like.

In the manufacture of tubing, it is common practice to engage a solid billet by a pair of offset rolls which are so disposed and so driven that they advance the billet over a piercing mandrel whereby a seamless tube is formed. The mandrel is supported on the end of a mandrel bar which extends away from the rolls in the direction of tube travel a distance at least as great as the length of the longest tube to be formed on the mill. During the piercing operation the tube, mandrel and mandrel bar rotate together due to the action of the rolls, and this necessitates a rotatable mounting for the end of the mandrel bar remote from the mandrel. After the tube is completely formed, it is necessary to remove the mandrel and withdraw the mandrel bar so that the formed tube can be removed from the mill. To accomplish this, it is a usual arrangement to rotatably mount the outer end of the mandrel bar on a carriage which travels toward and away from the roll pass on a runout table and advances and retracts the mandrel bar into and out of piercing position.

As tubes up to 50 feet or more in length or 18 inches or more in diameter are handled on this type of equipment, it will be understood that the bar which supports the mandrel must in many cases be a very long and heavy member. When the bar is moved into retracted position the carriage travels to the outer end of the runout table, and the inner end of the bar is supported at the face of the stripper which is a member adapted to engage the outer end of the formed tube and prevent it from moving with the bar as the bar is withdrawn.

During the withdrawal of the mandrel bar from the formed tube the bar does not rotate and, in prior apparatus of this type with which I am familiar, it was supported only at two points, the stripper and the carriage. Thus when the bar was fully withdrawn, it was supported only at each end and undesirable sagging of the unsupported mid-portion of the bar occurred, particularly where long, heavy bars were employed. It is, therefore, among the objects of the present invention to provide means for supporting the mandrel bar of a seamless tube mill or the like between the stripper and the carriage as the bar is withdrawn and advanced over the runout table.

Other objects of my invention include the provision of an automatically operated movable mandrel bar support which will at all times provide a support for the bar substantially midway between the carriage and the stripper or other fixed point of support; the provision of a simple mandrel bar support adapted to move on the runout table at a lower rate and for a shorter distance than the mandrel bar carriage; the provision of simple and effective interconnections between a mandrel bar carriage and a movable mandrel bar support disposed between the carriage and a fixed support, whereby the bar support will prevent undesirable sagging of the bar over the runout table, regardless of the position of the bar, and which will not interfere with the normal advancing and retracting of the bar; and the provision of a rugged runout carriage mandrel bar support which may be incorporated in the usual type of runout table arrangement without serious changes in the design and dimensions of the structure.

Reference has been made above to piercing mills for the manufacture of seamless tubes, but it will be understood by those skilled in the art that my improved mandrel bar support is also adaptable for use on reeling machines, which are generally similar to piercers and are used to perform a second operation on the tubes after they are pierced; and on tube expanding machines or other types of equipment in which it is desirable to provide an automatically operated intermediate support for an elongated bar as it is advanced or retracted.

The above and other objects of my invention will appear from the following description of one embodiment thereof, reference being had to the accompanying drawings in which I have diagrammatically illustrated apparatus embodying my invention and in which Figure 1 is a simplified illustrative side elevation of the runout table of a piercing mill or the like showing the mandrel rod and carriage, together with my improved support, in fully advanced position;

Figure 2 is a view similar to Figure 1, but showing the mandrel bar and the other elements of the apparatus in fully retracted position; and Figure 3 is a diagrammatic plan view illustrating the general layout of a piercing mill incorporating my improved bar support.

Referring first to Figure 3 which shows a typical arrangement of a piercing mill, the angularly disposed rolls 1 and 2 engage the billet 3 which is supported on an inlet table 4 and force the billet in the direction of the arrow over the mandrel 5 forming it into tubular shape as is seen at 6. The mandrel 5 is carried on the inner end of mandrel bar 7 and the outer end of this bar is rotatably mounted in the thrust block carriage 8. As the rolling operation continues, the billet 3 is forced over the mandrel 5 and until the piercing operation is completed at which time the tube 6 will extend over the mandrel bar 7 and the mandrel 5 will project out from the inner end of the tube in such manner that it may be removed and replaced by another mandrel for the next piercing operation.

After the piercing operation is completed the bar 7 is retracted by movement of the carriage 8 away from the stripper and stationary bar support 9. During this retraction of bar 7 the right-hand end of the tube 6 (Figure 3) may engage the face of the stripper 9 to prevent longitudinal movement of the tube and permit the bar 7 to be fully withdrawn. When the carriage 8 and bar 7 reach their fully retracted positions, indicated at 7' and 8' in Figure 3, the bar is supported at its inner end at the stationary support provided by the stripper 9 and at its outer end by the carriage 8'. Prior to the present invention, these two points were the sole support for the mandrel bar, and with the long and very heavy bars now in use undesirable sagging of the bars was frequently encountered.

To prevent this sagging, I provide a bar supporting carriage 10, suitably mounted for movement on the runout table or bed 11 which also supports and guides the carriage 8 in its movement toward and away from the stationary bar support 9. A roll 12 is rotatably mounted on the bar support 10 and is adapted to engage the mandrel bar 7 during its advancing and retracting movement, as is clearly seen in Figure 2. The bar 7 is rotatably mounted in the carriage 8 at 13 but, as has been explained above, the bar 7 only rotates during the piercing operation and does not rotate while being withdrawn and retracted.

In order to permit the bar 7 to be rotated when it is in fully advanced position, as shown in Figure 1, without excessive friction against the roll 12, the bar is reduced in diameter at 14, adjacent the carriage 8, so that when the bar 7 is fully advanced the portion 14 thereof will be out of contact with the roll 12. Thus, at the fully advanced position of the bar, no support is provided between the stationary bar support 9 and the carriage 8 but the unsupported length of the bar between the stationary support and carriage in this position is so short that intermediate support is not required. The reduced portion 14 is joined to the main bar section 7 by a tapered shoulder 15 which permits the bar to ride up on the roll 12 without undue shock as the bar is retracted.

In order to move the carriage 8 back and forth on the runout table 11 for the full length of the mandrel bar, and to move the bar supporting carriage 10 simultaneously along the runout table in such manner that the roll 12 will always be disposed substantially half way between the stripper or fixed support 9 and the rotatable mount 13, I provide operating cable connections which furnish a simple and effective means for moving the bar support 10 in the desired relation to the movement of the carriage 8.

In Figure 1, the parts are shown in fully advanced position. A cable 16 is attached to the carriage 8 at 17 and extends over the rear sheave or driving drum 18 and back the full length of the runout table 11 to the freely rotatable front sheave 19 which is mounted on a fixed support or base 19ª. The drum 18 is mounted on a fixed base at the outer end of the runout table or bed 11 and may be driven by any suitable means such as reversible motor 20 through a suitable gear box or other driving connection. Sheave 19 is supported for free rotation on its base 19ª at the front or inner end of the runout table, and the cable 16 passes around sheave 19 and then around freely rotatable sheave 21 on the bar support carriage 10 and back to a fixed anchor at 22. Another cable 23 is secured to the carriage 8 at 24 and extends around the sheave 25, which is also freely rotatable and carried by the bar support carriage 10. The other end of cable 23 is attached to a fixed anchor 26 mounted on the foundation between the ends of the runout table 11.

When the motor 20 is operated to rotate the drum 18 in the direction of the arrow in Figure 1, the carriage 8 will be moved away from the stripper 9 to retract the bar 7. At the same time, the cable 23, which has a fixed anchor at 26 and is connected to the carriage 8 at 24, will move the bar support 10 and the roll 12 in the same direction at a rate which is half the rate of movement of carriage 8 and for a distance half as great as the distance travelled by the carriage 8. Thus, at any point in the retracting movement of the bar 7, the roll 12 will afford a support therefor substantially midway between the stationary support 9 and the carriage 8, and when the bar is fully retracted the parts will be in the position shown in Figure 2.

When it is desired to advance the bar 7 for another piercing operation, the drum 18 will be rotated in the direction shown by the arrow in Figure 2 and the cable 16, acting through the sheaves 19 and 21, will move the bar support 10 toward the stationary support 9 at one half the rate of movement of the carriage 8 until the parts are returned to the position shown in Figure 1. It will be understood that the cable 16 will be so connected to the drum 18 that positive drive may be maintained. The cable 16 may be made in two parts, one extending from the carriage 8 to the drum 18 and winding up on the drum during retracting movement of the carriage, and the other part extending from the drum to the sheaves 19 and 21 and back to the anchor 22. This second part of cable 16 will, of course, unwind from the drum during retracting movement to permit the cable 23 to move the support 10 away from the stripper 9. Suitable turnbuckles or other adjusting means may be provided at 27, 28 and 29 to maintain the desired tension on the cables 16 and 23. The usual locking dog or latch 30 engages an abutment 31 on the carriage 8 when the bar 7 is fully advanced in order to resist the thrust on the mandrel 5 and bar 7 caused by the engagement of the tube with the mandrel. This latch 30 is swung out of the way as seen in Figure 2 when the carriage 8 is retracted.

From the above description of one form of my invention, it will be seen that I have provided a mandrel bar support which is automatically maintained in a position substantially midway of the unsupported length of the bar as it is advanced and retracted over the runout table. The support does not interfere with rotation of the bar when in fully advanced position and does not require a separate source of power or complicated controls of any nature. The accompanying drawings are diagrammatic in character for purposes of simplification, and it will be understood that the equipment as installed in practice would include various elements which are not shown herein. Furthermore, although I have described one form of my invention in considerable detail, it will be understood that variations and modifications may be made in the form and arrangement of the parts, and I do not, therefore, wish to be limited to the particular apparatus herein shown and described, but claim as my invention all embodiments thereof coming within the scope of the appended claims.

I claim:

1. In mandrel bar supporting and operating apparatus, a table, a carriage movable over said table, a mandrel bar secured to said carriage, an intermediate bar support movable along said table in supporting relation to said bar, front and rear sheaves rotatably mounted at opposite ends of said table, a second pair of sheaves rotatably mounted on said intermediate bar support, a cable secured at one end to said carriage and extending around said rear sheave, said forward sheave and one of the sheaves on said bar support, said cable having driving engagement with said rear sheave and having its other end anchored adjacent the front end of said table, a fixed anchor disposed between said ends of said table, and another cable extending from said carriage around the other sheave on said intermediate bar support and back to said fixed anchor between the rear end of said table and the most rearward position of said bar support on said table.

2. In mandrel bar supporting and operating apparatus, a table, a carriage movable over said table, a mandrel bar secured to said carriage, an intermediate bar support movable along said table in supporting relation to said bar, front and rear sheaves rotatably mounted at opposite ends of said table, a second pair of sheaves rotatably mounted on said intermediate bar support, a cable secured at one end to said carriage and extending around said rear sheave, said forward sheave and one of the sheaves on said bar support, said cable having driving engagement with said rear sheave and having its other end anchored adjacent the front end of said table, a fixed anchor disposed between said ends of said table, another cable extending from said carriage around the other sheave on said intermediate bar support and back to said fixed anchor between the rear end of said table and the most rearward position of said bar support on said table, and reversible means for driving said rear sheave whereby said carriage may be advanced or retracted over said table.

3. Mandrel bar operating and supporting apparatus for seamless tube mills or the like including in combination, a mandrel bar, a runout table for said bar, a stationary bar support at one end of said table, a thrust block carriage supported for movement over said table toward and away from said stationary support, one end of said mandrel bar being rotatably attached to said carriage, an intermediate bar support below said bar and between said stationary support and said carriage, means for moving said carriage along said table, a roll carried by said intermediate support and adapted to engage said bar, said bar having a portion of reduced diameter adjacent the end attached to said carriage whereby said bar will be out of engagement with said roll when said carriage is at the stationary support end of its movement, and driving connections between said carriage and said bar support for moving said intermediate bar support along said table simultaneously with and in the same direction as said carriage, said driving connections including means for maintaining the speed of travel of said intermediate support at a rate substantially one-half as great as the rate of movement of the carriage.

4. An apparatus for operating mandrel bars including in combination, a table, a thrust block carriage movable along said table from an advanced position to a retracted position, an elongated mandrel bar secured to said carriage at one end and axially movable therewith, a stationary mandrel bar support mounted on said table adjacent said advanced position for supporting the other end of said bar when said carriage is in its retracted position and for supporting said bar intermediate of its length during movement of said carriage as the said other end of said bar moves beyond said stationary support, a movable bar support located midway between said stationary support and carriage, and means for moving said movable bar support relative to the movement of said carriage so that the position of said movable bar support will be maintained at its midway position with respect to said stationary bar support and carriage irrespective of the movement of the latter including means for moving said movable bar support and means operated by said carriage movement for controlling the movement of said last mentioned means.

MAX JAENCHEN.

REFERENCES CITED

The following references are of record in the file of this patent:

UNITED STATES PATENTS

| Number | Name | Date |
|---|---|---|
| 1,684,887 | Ridgway | Sept. 18, 1928 |
| 1,973,687 | Moise | Sept. 11, 1943 |